(12) United States Patent
Yeh et al.

(10) Patent No.: US 8,270,604 B2
(45) Date of Patent: Sep. 18, 2012

(54) SYSTEM AND METHOD FOR REMOTE SIGNATURE ACQUISITION

(75) Inventors: Chin-Wen Yeh, Taipei Hsien (TW); Zhen-Neng Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 691 days.

(21) Appl. No.: 12/476,747

(22) Filed: Jun. 2, 2009

(65) Prior Publication Data

US 2010/0086131 A1    Apr. 8, 2010

(30) Foreign Application Priority Data

Oct. 8, 2008   (CN) .......................... 2008 1 0304779

(51) Int. Cl.
*H04N 7/167* (2011.01)
(52) U.S. Cl. ........ 380/234; 380/243; 380/100; 380/119; 348/211.99; 348/586; 348/587; 715/700; 367/197

(58) Field of Classification Search .................. 380/234, 380/243; 382/100, 119; 348/211.99, 586–587; 715/700
See application file for complete search history.

(56) References Cited

U.S. PATENT DOCUMENTS

| | | | | |
|---|---|---|---|---|
| 5,471,277 A | * | 11/1995 | Fujioka et al. | 355/25 |
| 6,052,120 A | * | 4/2000 | Nahi et al. | 715/700 |
| 7,526,108 B2 | * | 4/2009 | Zank et al. | 382/119 |

* cited by examiner

*Primary Examiner* — Thanhnga B Truong
(74) *Attorney, Agent, or Firm* — Altis Law Group, Inc.

(57) ABSTRACT

A system for remote signature acquisition, includes a local computer located in a first position where a document is needs to be executed, a remote computer located at a second position, a camera connected to the local computer, a tablet connected to the remote computer, and a plotting instrument connected to the local computer. The remote computer is connected to the local computer via a network. The camera presents information of the document to the remote computer via the local computer and network for display at the second position. The tablet records the corresponding input thereon and converts the input to a digital signal which is capable of being transmitted to the local computer via the remote computer and network. The local computer directs the plotting instrument to inscribe the corresponding input on the document according to the digital signal.

10 Claims, 2 Drawing Sheets

SYSTEM AND METHOD FOR REMOTE SIGNATURE ACQUISITION

BACKGROUND

1. Technical Field

The present embodiment relates to secure signature-based access, and particularly to a system providing remote signature authorization.

2. Description of Related Art

With all the advantages of the Internet, there has been a movement to migrate many cooperative operations to the Internet. Such operations, while benefiting from the convenience and speed of the Internet, may be classified as secure and require authorization prior to access. A conventional means is use of a digital signature or other written authorization. A digital signature is typically based on asymmetric cryptography, wherein each user has a unique pair of private and public keys, duly certified by a trusted certificate authority. When a user signs a document via the digital signature, a unique mathematical code is created with the help of the user's private key. This signature can identify the user's identity by the signature's relationship to the digital certificate. However, the digital signature cannot be used with hand copy documentation.

Therefore, there is room for improvement within the art.

BRIEF DESCRIPTION OF THE DRAWINGS

Many aspects of the embodiments can be better understood with references to the following drawings. The components in the drawings are not necessarily inscribed to scale, the emphasis instead being placed upon clearly illustrating the principles of the embodiments. Moreover, in the drawings, like reference numerals designate corresponding parts throughout the several views.

DETAILED DESCRIPTION

Figure 1:
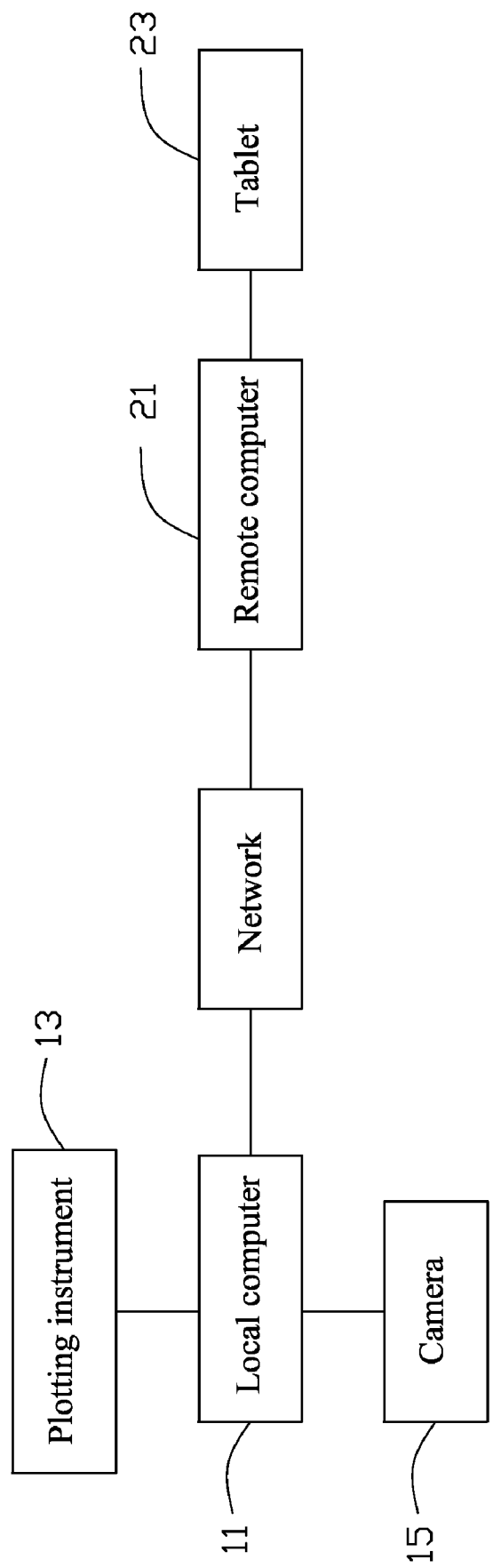
FIG. 1 is a block diagram of a system for remote signature acquisition.

Referring to FIG. 1, a system for remote signature acquisition includes a local computer 11, a camera 15 connected to the local computer 11, a plotting instrument 13 connected to the local computer 11, a remote computer 21, and a tablet 23 connected to the remote computer 21. The local computer 11 is located in a first position where a document is located, and the remote computer 21 is located in a remote second position where a user is located. The local computer 11 and the remote computer 21 are connected via a network, such as the Internet.

In the present embodiment, the local computer 11 and the remote computer 21 can be personal computers, servers, or other portable terminals. The camera 15 provides high definition image capture. The plotting instrument 13 is controlled by the local computer 11. The tablet 23 accepts user input which is then converted to digital information.

Figure 2:
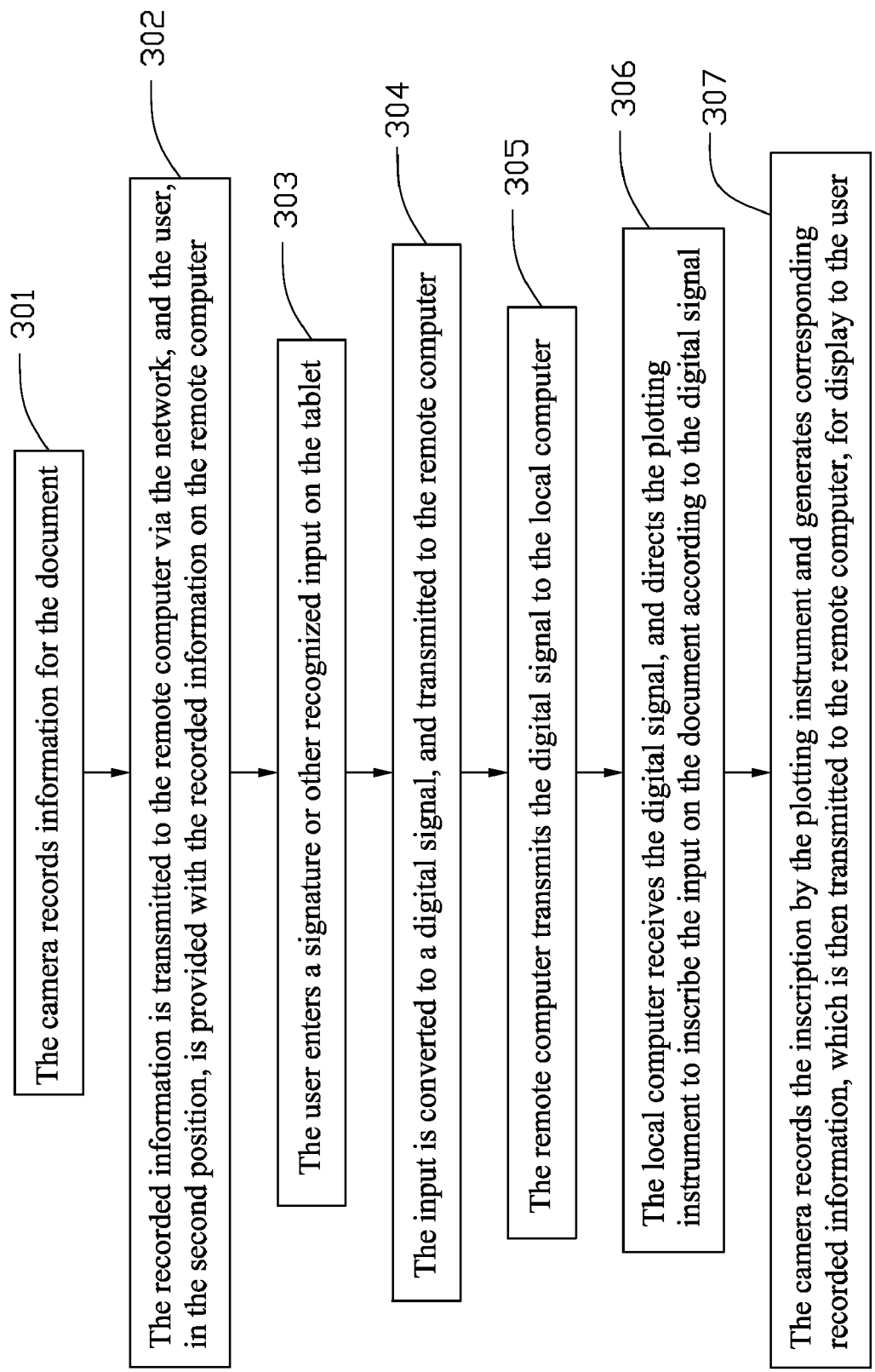
FIG. 2 is a flow chart of a method for remote authorization acquisition.

Referring to FIG. 2, in use, the camera 15 records information for the document (step 301). The recorded information is transmitted to the local computer 11, which transmits the recorded information to the remote computer 21 via the network. The user, in the second position, is provided with the recorded information on the remote computer 21 (step 302). The user enters a signature or other recognized input on the tablet 23 (step 303). The input is converted into a digital signal, and transmitted to the remote computer 21 (step 304).

The remote computer 21 then transmits the digital signal to the local computer 11 (step 305). The local computer 11 receives the digital signal, and directs the plotting instrument 13 to inscribe the input on the document according to the digital signal (step 306). The camera 15 records the inscription by the plotting instrument and generates corresponding recorded information, which is then transmitted to the remote computer 21, for display to the user (step 307).

In the above embodiment, for security, the remote computer 21 can encrypt the digital signal before transmission thereof to the local computer 11. If the document has a plurality of pages, the system is equipped with a page turning apparatus to turn the pages of the document. The system is further equipped with a robot arm to move the document for the camera to conveniently record the document and the plotting instrument inscribing the input in the correct place of the document.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A system for remote signature acquisition, comprising:
   a local computer located in a first position where a document to be inscribed;
   a remote computer located at a second position, the remote computer connected to the local computer via a network;
   a camera located in the first position and connected to the local computer, the camera capable of presenting information of the document to the remote computer via the local computer and the network;
   a tablet located in a second position and connected to the remote computer, the tablet being capable of recording an input written on the tablet and converting the input to a digital signal, and the table being adapted to transmit the digital signal to the local computer via the remote computer and the network; and
   a plotting instrument located in the first position, the plotting instrument being connected to and directed by the local computer, the plotting instrument being adapted to inscribe the input on the document according to the digital signal.

2. The system of claim 1, wherein the remote computer is capable of encrypting the digital signal before the digital signal is transmitted to the local computer.

3. The system of claim 1, further comprising a page turning apparatus capable of turn the pages of the document.

4. The system of claim 1, further comprising a robot arm to relocate the document for the camera to record the document information and the plotting instrument to inscribe the signature on the document in a desired location.

5. The system of claim 1, wherein the local computer or remote computer is a personal computer, server, or portable terminal.

6. The system of the claim 1, wherein the camera is capable of recording the information of the document, and transmitting the information to the remote computer via the local computer and the network for displaying at the second position.

7. A remote signature acquisition method, comprising steps in an order as follows:

providing a camera, a local computer, a tablet, a plotting apparatus, and a robot arm;

placing a document in front of the camera by the robot arm;

recording information of the document by the camera;

transmitting recorded information of the document from the camera to a remote computer;

connecting the tablet to the remote computer;

inputting a written signature on the tablet corresponding to the recorded information received by the remote computer;

converting the written signature into a digital signal;

sending the digital signal to the local computer; and controlling the plotting apparatus to inscribe the written signature corresponding to the digital signal on the document by the local computer.

8. The method of claim 7, wherein after the step of controlling the plotting apparatus and inscribing the written signature, the camera records the inscribed written signature.

9. The method of claim 7, wherein before the step of sending the digital signal to the local computer, the remote computer encrypts the digital signal.

10. A remote signature acquisition system, comprising:

a local computer, a document, a camera, a robot arm, and a plotting instrument located in a first position; both the camera and the plotting instrument are connected to the local computer; the robot arm is adapted to place a document in front of the camera; and the plotting instrument is adapted to inscribe on the document;

a remote computer and a tablet located in a second position, the remote computer being connected to the local computer via a network, the tablet being connected to the remote computer;

wherein the camera is adapted to present information of the document to the remote computer via the local computer and the network; the tablet is adapted to record an input written on the tablet; the tablet is further adapted to convert the input to a digital signal and to transmit the digital signal to the local computer via the remote computer and the network; and the local computer is adapted to direct the plotting instrument to inscribe the input on the document according to the digital signal.

* * * * *